UNITED STATES PATENT OFFICE.

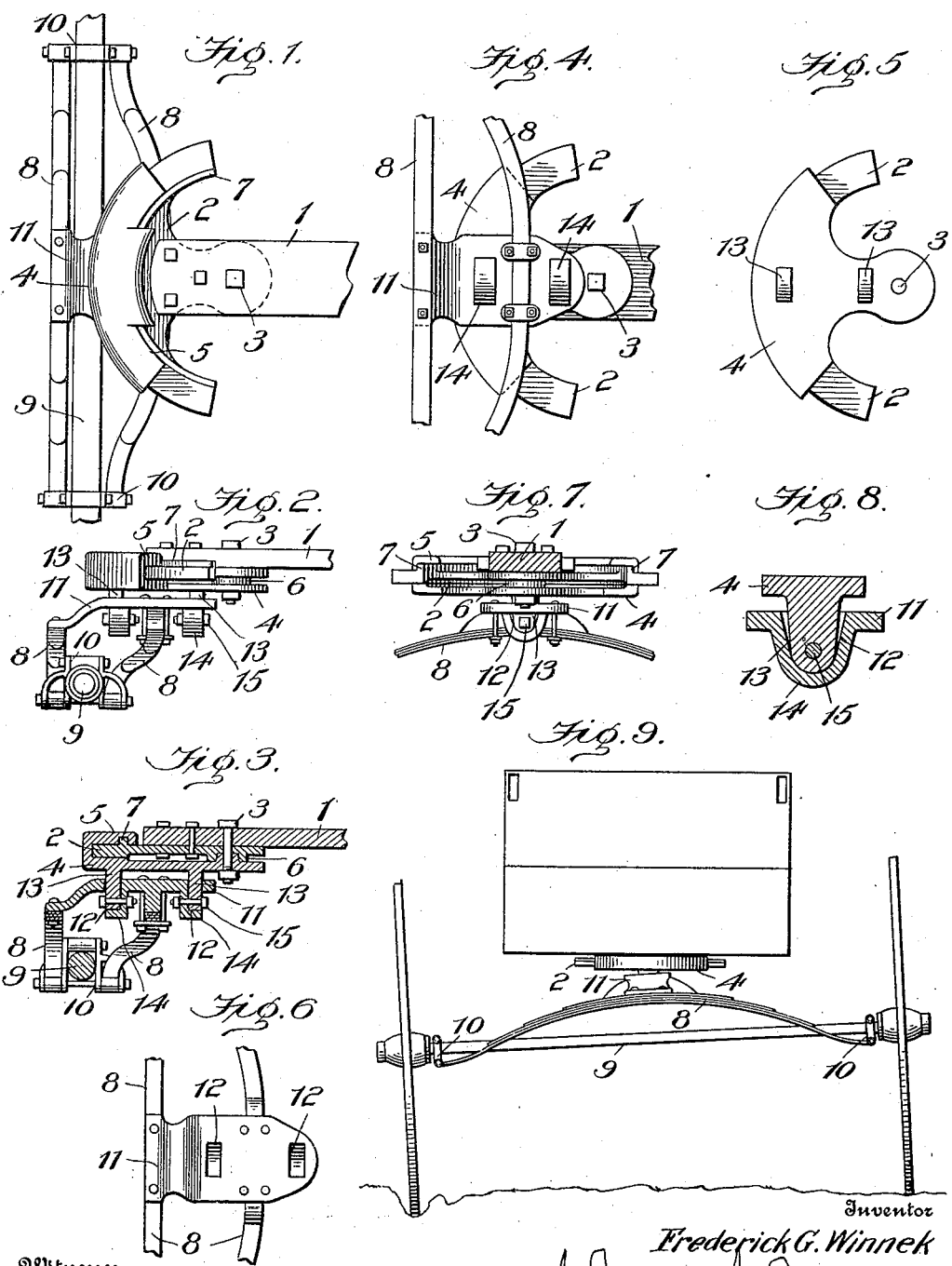

FREDERICK G. WINNEK, OF DEARBORN, MISSOURI.

FIFTH-WHEEL FOR VEHICLES.

No. 819,395.  Specification of Letters Patent.  Patented May 1, 1906.

Application filed November 6, 1905. Serial No. 286,038.

*To all whom it may concern:*

Be it known that I, FREDERICK G. WINNEK, a citizen of the United States, residing at Dearborn, in the county of Platte and State of Missouri, have invented certain new and useful Improvements in Fifth-Wheels for Vehicles; and I do hereby declare the following to be a full, clear, and exact description of the invention, such as will enable others skilled in the art to which it appertains to make and use the same.

It is the object of my invention to prevent the side thrust of the vehicle-body and the resulting strain and cramping on the springs and their connections and to so mount the fifth-wheel members upon the springs that any sudden drop or the lifting of a wheel will not cause a side thrust upon the fifth-wheel members or upon the body or upon the king-bolt. For this purpose I have devised a pivotal mounting of the fifth-wheel upon the springs, whereby the body of the vehicle and the fifth-wheel members are caused to remain substantially level in the event of the sudden dropping or lifting of either of the front wheels, and thereby render the connections of the fifth-wheel, the king-bolt, and the springs more durable, with the advantage of causing an easy swing or rocking of the body, and in the claims appended hereto I will point out the construction wherein my improvement resides.

Referring to the accompanying drawings, Figure 1 shows in top view the fifth-wheel mounted upon the reach-bar and upon a pair of semi-elliptical springs. Fig. 2 is a side view of the same, showing the fifth-wheel pivotally mounted upon a saddle-plate fixed to the springs. Fig. 3 is a vertical section of the same, taken transversely to the axle and through the pivotal mountings of the fifth-wheel. Fig. 4 shows the under side of the fifth-wheel, its saddle-support, and the saddle connection with the springs. Fig. 5 shows the under side of the fifth-wheel members. Fig. 6 shows a top view of the saddle-plate and its connected springs. Fig. 7 is a rear view of the fifth-wheel and its mounting-saddle, the reach being shown in section. Fig. 8 is a transverse section showing the pivotal connection of the lower member of the fifth-wheel with the saddle-plate. Fig. 9 is a front view showing the axle, its springs, and the saddle-plate tilted to one side and the vehicle-body and the fifth-wheel in level positions.

The reach 1 is preferably a wide bar which connects the fifth-wheel with the rear axle and forms the support for the body of the vehicle. To the forward end of the reach the upper member 2 of the fifth-wheel is secured in any suitable way, and through an arm of said member the king-bolt 3 passes and forms the center on which the fifth-wheel turns. The under or coupling member 4 of the fifth-wheel is formed at its front edge with a groove by an overhanging rim part 5, adapted to receive and hold the front edge of the top member, and the two members are centered and held together by a coupling center-boss and socket 6, through which the king-bolt passes. To add to the security of the connection of the fifth-wheel members by the king-bolt, the overhanging rim has a groove to receive a rib 7 on the upper member, said interlocking front connection conforming to the circle of the fifth-wheel members and of which the king-bolt is the center. The springs 8 8 are connected as a pair to the front and rear sides of the front axle 9 by clips 10 10 and are secured together at the top by a saddle-plate 11, the under side of which has a concave seating upon the springs and is secured to them by clips, as in Fig. 7. For this purpose the saddle-plate 11 has oblong sockets 12 12, Figs. 6 and 8, preferably a pair transverse to the saddle, and to this saddle the springs are fastened, the sockets being open at the top and their walls 14 depending below the bottom of the saddle-plate. Depending from the bottom member of the fifth-wheel is a pair of tenons 13 13, adapted to fit into the sockets 12 and be secured therein by a bolt or bolts, as in Figs. 3 and 8, passing through the walls 14 of the sockets and through the tenons connecting the fifth-wheel with the saddle. The saddle, its connected springs, and the axle will by this mounting be free to have a limited tilting sidewise movement on the bolt which connects the saddle with the lower member of the fifth-wheel, as in Fig. 8, while the vehicle-body will remain in a level position, as in Fig. 9. The tenon connection for this purpose is in line with the king-bolt and the reach, as in Fig. 4, and I prefer that the ends of the tenons be rounded and rest on the rounded bottoms of the sockets, as in Fig. 8, and support the fifth-wheel a little above the saddle-plate to allow the saddle-plate to have a proper sidewise tilting movement on the tenons, so that there will be comparatively little strain and wear on the pivot.

I claim—

1. In a fifth-wheel including the king-bolt and the axle, the lower member of the fifth-wheel having a pair of depending tenons, a saddle-plate having corresponding depending sockets open at the top of said saddle-plate, each socket closed at its sides and bottom and adapted each to receive one of said tenons, the opposite walls of said sockets flaring upward whereby to form separate closures and abutments for said separate tenons to limit their sidewise rocking movements in the sockets, pivot-bolts confining said tenons within their sockets, and means for supporting the saddle-plate upon the axle.

2. In a fifth-wheel, the lower member whereof formed with a pair of depending tenons, a saddle-plate having corresponding depending sockets open at the top of said saddle-plates, each socket closed at its sides and bottom and adapted each to receive one of said tenons, the axle, a pair of springs secured thereto one of said springs supporting the front end of the saddle-plate, the other spring supporting said saddle-plate between its depending sockets, and pivot-bolts confining said tenons within their sockets.

3. In a vehicle running-gear, the combination with the body and the reach-bar, the upper member of the fifth-wheel fixed to said bar, the front axle, a pair of springs fixed thereon one at the front and one at the rear side thereof, a saddle-plate fixed upon said springs, the king-bolt, and means for pivotally mounting the fifth-wheel upon said saddle plate consisting of a pair of lugs or tenons depending from the upper member of the fifth-wheel and sockets in said saddle-plate within which the lugs or tenons are pivotally mounted on each side of the fastening of said saddle-plate to the spring at the inner side of the axle, for the purpose stated.

In testimony whereof I have signed my name to this specification in the presence of two subscribing witnesses.

FREDERICK G. WINNEK.

Witnesses:
WILLIAM O. HARRINGTON,
W. H. GABBERT.